US009230333B2

(12) United States Patent
Robinson et al.

(10) Patent No.: US 9,230,333 B2
(45) Date of Patent: Jan. 5, 2016

(54) METHOD AND APPARATUS FOR IMAGE PROCESSING

(75) Inventors: Ian S. Robinson, Redondo Beach, CA (US); John D. Bloomer, Redondo Beach, CA (US); Bradley A. Flanders, Whittier, CA (US)

(73) Assignee: Raytheon Company, Waltham, MA (US)

(*) Notice: Subject to any disclaimer, the term of this patent is extended or adjusted under 35 U.S.C. 154(b) by 203 days.

(21) Appl. No.: 13/402,366

(22) Filed: Feb. 22, 2012

(65) Prior Publication Data

US 2013/0216144 A1    Aug. 22, 2013

(51) Int. Cl.
*G06K 9/36* (2006.01)
*G06T 7/20* (2006.01)
(Continued)

(52) U.S. Cl.
CPC .......... *G06T 7/2006* (2013.01); *G06T 7/2053* (2013.01); *G06T 9/00* (2013.01); *H04N 19/102* (2014.11); *H04N 19/137* (2014.11); *H04N 19/17* (2014.11); *H04N 19/20* (2014.11); *G06T 2207/10016* (2013.01); *G06T 2207/10032* (2013.01); *G08B 13/19602* (2013.01); *G08B 13/19606* (2013.01)

(58) Field of Classification Search
CPC ....... G06T 7/2006; G06T 7/2053; G06T 9/00; G06T 2207/10016; G06T 2207/10032; H04N 19/00012; H04N 19/00145; H04N 19/0026; H04N 19/00387; G08B 13/19602; G08B 13/19606
USPC ......... 382/128, 199, 233, 103, 169, 291, 173, 382/203, 232; 348/169, 699, 452; 375/240.16, 240.26; 386/46
See application file for complete search history.

(56) References Cited

U.S. PATENT DOCUMENTS 5,109,435 A *  4/1992  Lo .......................... G06F 17/153
                                                              348/172
5,991,444 A   11/1999  Burt et al.
(Continued)

FOREIGN PATENT DOCUMENTS

DE        196 15 657 A1    8/1997
JP        06078272 A  *   3/1994  ............... H04N 5/29
(Continued)

OTHER PUBLICATIONS

Anandan et al., "Video as an image data source: efficient representations and applications," Proceedings of the International Conference on Image Processing (ICIP). Washington, Oct. 23-26, 1995; IEEE Comp.Soc. Press, US vol. 1, pp. 318-321.
(Continued)

*Primary Examiner* — Mekonen Bekele
(74) *Attorney, Agent, or Firm* — Burns & Levinson LLP; Joseph M. Maraia

(57) ABSTRACT

In accordance with various aspects of the disclosure, a system, a method, and computer readable medium having instructions for processing images is disclosed. For example, the method includes receiving, at an image processor, a set of images corresponding to a scene changing with time, decomposing, at the image processor, the set of images to detect static objects, leaner objects, and mover objects in the scene, the mover objects being objects that change spatial orientation in the scene with time, and compressing, using the image processor, the mover objects in the scene separately at a rate different from that of the static objects and the leaner objects for storage and/or transmission.

23 Claims, 17 Drawing Sheets

(51) Int. Cl.
*G06T 9/00* (2006.01)
*H04N 19/102* (2014.01)
*H04N 19/137* (2014.01)
*H04N 19/17* (2014.01)
*H04N 19/20* (2014.01)
*G08B 13/196* (2006.01)

(56) References Cited

U.S. PATENT DOCUMENTS

| | | | |
|---|---|---|---|
| 6,738,424 B1* | 5/2004 | Allmen | G06T 9/001 375/240.08 |
| 7,085,401 B2* | 8/2006 | Averbuch et al. | 382/103 |
| 7,366,325 B2 | 4/2008 | Fujimura et al. | |
| 7,440,637 B2 | 10/2008 | Schechner et al. | |
| 7,650,058 B1* | 1/2010 | Garoutte | G08B 13/19604 382/103 |
| 7,792,520 B2* | 9/2010 | Sohn et al. | 455/418 |
| 7,990,422 B2 | 8/2011 | Ahiska et al. | |
| 8,004,570 B2 | 8/2011 | Saito et al. | |
| 8,325,799 B2 | 12/2012 | Chono et al. | |
| 8,400,619 B1* | 3/2013 | Bachrach | G01C 1/04 356/4.01 |
| 2003/0122862 A1 | 7/2003 | Takaku | H04N 21/23412 715/723 |
| 2003/0122868 A1* | 7/2003 | Aggarwal | G06F 3/0482 715/760 |
| 2003/0215141 A1 | 11/2003 | Zakrzewski et al. | |
| 2004/0197014 A1 | 10/2004 | Oohashi | |
| 2005/0158023 A1* | 7/2005 | Takasu et al. | 386/52 |
| 2005/0162701 A1* | 7/2005 | Hirano | H04N 5/44591 358/1.18 |
| 2006/0045311 A1* | 3/2006 | Shibuya | G01C 11/00 382/103 |
| 2007/0071296 A1* | 3/2007 | Nonaka et al. | 382/128 |
| 2007/0132856 A1 | 6/2007 | Saito et al. | |
| 2007/0253625 A1* | 11/2007 | Yi | G01S 7/412 382/228 |
| 2008/0063355 A1* | 3/2008 | Nakano | H04N 5/44504 386/239 |
| 2008/0273751 A1 | 11/2008 | Yuan et al. | |
| 2009/0136023 A1 | 5/2009 | Pan et al. | |
| 2010/0014709 A1 | 1/2010 | Wheeler et al. | |
| 2010/0073519 A1 | 3/2010 | Onoe et al. | |
| 2010/0097444 A1 | 4/2010 | Lablans | |
| 2010/0100835 A1 | 4/2010 | Klaric et al. | |
| 2010/0265364 A1 | 10/2010 | Robinson et al. | |
| 2012/0098933 A1* | 4/2012 | Robinson | H04N 13/0018 348/46 |
| 2012/0177121 A1* | 7/2012 | Tripathi | G06T 7/0079 375/240.16 |
| 2012/0320237 A1* | 12/2012 | Liu | H04N 5/272 348/239 |

FOREIGN PATENT DOCUMENTS

| | | |
|---|---|---|
| JP | 09200704 A * | 7/1997 |
| WO | 03058960 A1 | 7/2003 |
| WO | 2003058960 A1 | 7/2003 |
| WO | 2008/072024 A1 | 6/2008 |

OTHER PUBLICATIONS

Wiegand et al.; "Overview of the H.264/AVC Video Coding Standard"; IEEE Transactions on Circuits and Systems for Video Technology; Jul. 1, 2003; pp. 560-576; 13(7); IEEE Service Center; Piscataway, NJ, US.

Creech; "NGA Approaches to Wide Area Motion Imagery"; National Geospatial-Intelligence Agency; pp. 1-21; [Approved for Public Release 11-146][AIE Eastern FMV Conference][Feb. 28, 2011-Mar. 2, 2011].

Heller; "From Video to Knowledge"; Lawrence Livermore National Laboratory; pp. 4-11 (2011).

Nadernejad et al.; "Edge Detection Techniques: Evaluations and Comparisons"; Applied Mathematical Sciences; 2 (31):1507-1520 (2008).

Seitz et al.; "A Comparison and Evaluation of Multi-View Stereo Reconstruction Algorithms"; Proceedings of the 2006 IEEE Computer Society Conference on Computer Vision and Pattern Recognition; vol. 1—8 pages (2006).

Singh; "Performance Analysis for Objective Methods of Video Quality Assessment"; 9 pages; [Printed online: Oct. 24, 2010 at http://www.eetimes.com/General/DisplayPrintViewContent?contentItemId=4196911; Published Oct. 18, 2005].

Sullivan et al.; "The H.264/AVC Advanced Video Coding Standard: Overview and Introduction to the Fidelity Range Extensions"; SPIE Conference on Applications of Digital Image Processing XXVII; pp. 1-22 (2004).

* cited by examiner

METHOD AND APPARATUS FOR IMAGE PROCESSING

BACKGROUND

This disclosure relates generally to the field of image processing and more particularly to a method and apparatus for decomposition and compression of motion imagery.

In conventional image processing scenarios, sensor data obtained from the image or scene being observed often overwhelms the processing capabilities of the image processing systems. Spatial-temporal compression of images is standardized in MPEG4/H.264 and other MPEG standards that apply the same image compression to the whole image. However, such conventional techniques are geared toward TV/movie type scenes, and are not optimized for airborne/space sensors. As a result, using such conventional techniques creates communications bottlenecks. Some conventional techniques characterize the apparent motion of the background and compress this information iteratively. However, such iterative processes are computationally intensive and require tracking of a large number of changes to identify moving pixels/objects from static image pixels/objects.

SUMMARY

In accordance with an embodiment, a method for processing images includes receiving, at an image processor, a set of images corresponding to a scene changing with time, decomposing, at the image processor, the set of images to detect static objects, leaner objects, and mover objects in the scene, the mover objects being objects that change spatial orientation in the scene with time, and compressing, using the image processor, the mover objects in the scene separately at a rate different from that of the static objects and the leaner objects for storage and/or transmission.

In accordance with an embodiment, an image processing system includes an imaging platform having a sensor that is configured to capture images of a scene, each image comprising a plurality of pixels, and an image processor coupled to the imaging platform and to one or more memory devices having instructions thereupon. The instructions when executed by the image processor cause the image processor to receive a set of images corresponding to a scene changing with time, decompose the set of images to detect static objects, leaner objects, and mover objects in the scene, the mover objects being objects that change spatial orientation in the scene with time, and compress the mover objects in the scene separately at a rate different from that of the static objects and the leaner objects for storage and/or transmission.

In accordance with an embodiment, a tangible computer-readable storage medium includes one or more computer-readable instructions thereon for processing images, which when executed by one or more processors cause the one or more processors to receive a set of images corresponding to a scene changing with time, decompose the set of images to detect static objects, leaner objects, and mover objects in the scene, the mover objects being objects that change spatial orientation in the scene with time, and compress the mover objects in the scene separately at a rate different from that of the static objects and the leaner objects for storage and/or transmission.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

DETAILED DESCRIPTION

Figure 1:
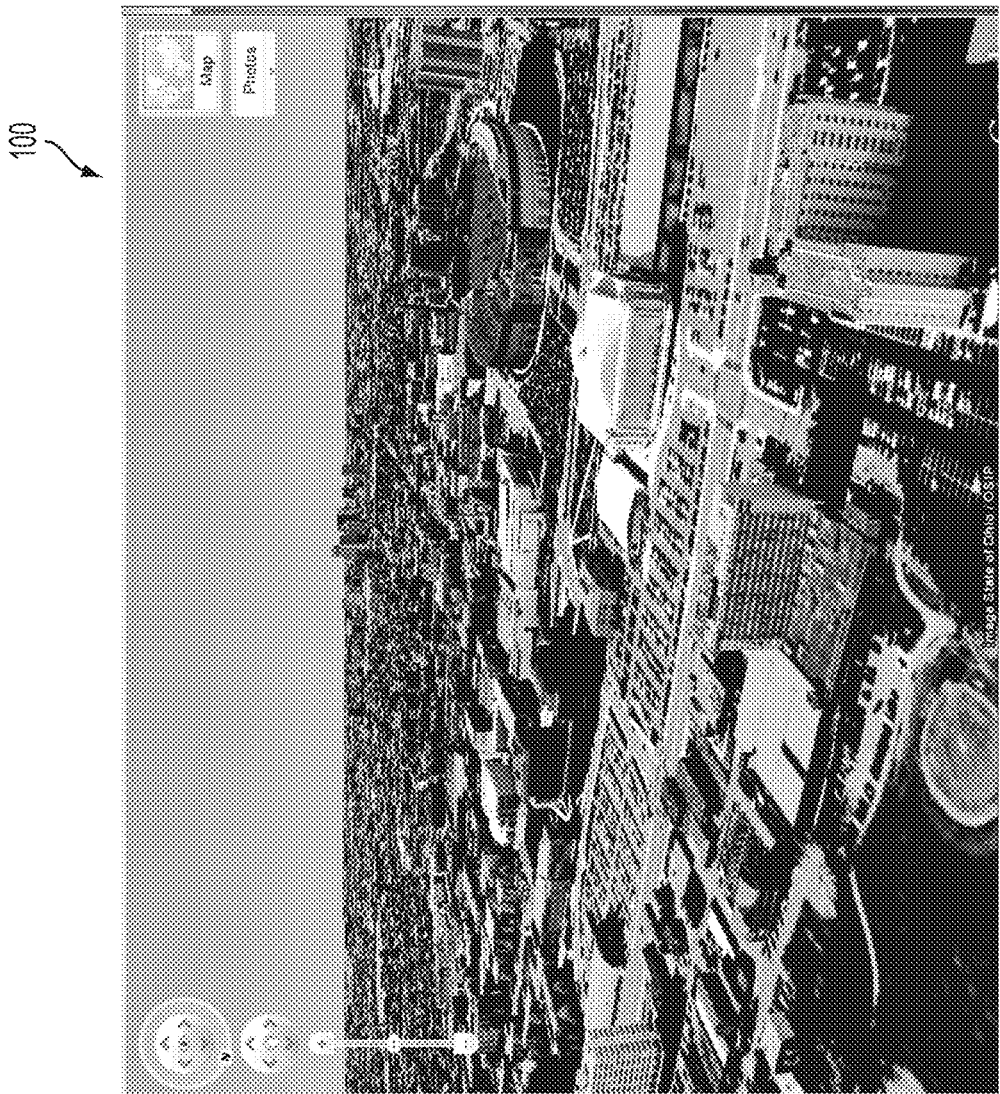
FIG. 1 shows an exemplary scene that is observed by an imaging platform, in accordance with an embodiment.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

FIG. 1 illustrates exemplary scene 100 that is to be observed using one or more sensors. Scene 100 is dynamically changing in time having moving objects or movers and static objects of varying physical dimensions. For example, scene 100 shows features associated with streets, parks, buildings of different heights and shapes, and vehicles. In addition, scene 100 includes varying illumination of different parts, for example, shadow regions and well-lit regions. Various features of scene 100 will have unique optical or visual characteristics that are used to obtain pixilated frames of scene 100. Generally, at least a portion of scene 100 will fall in the field of view of an observing platform (not shown), as discussed in FIG. 2.

Figure 2:
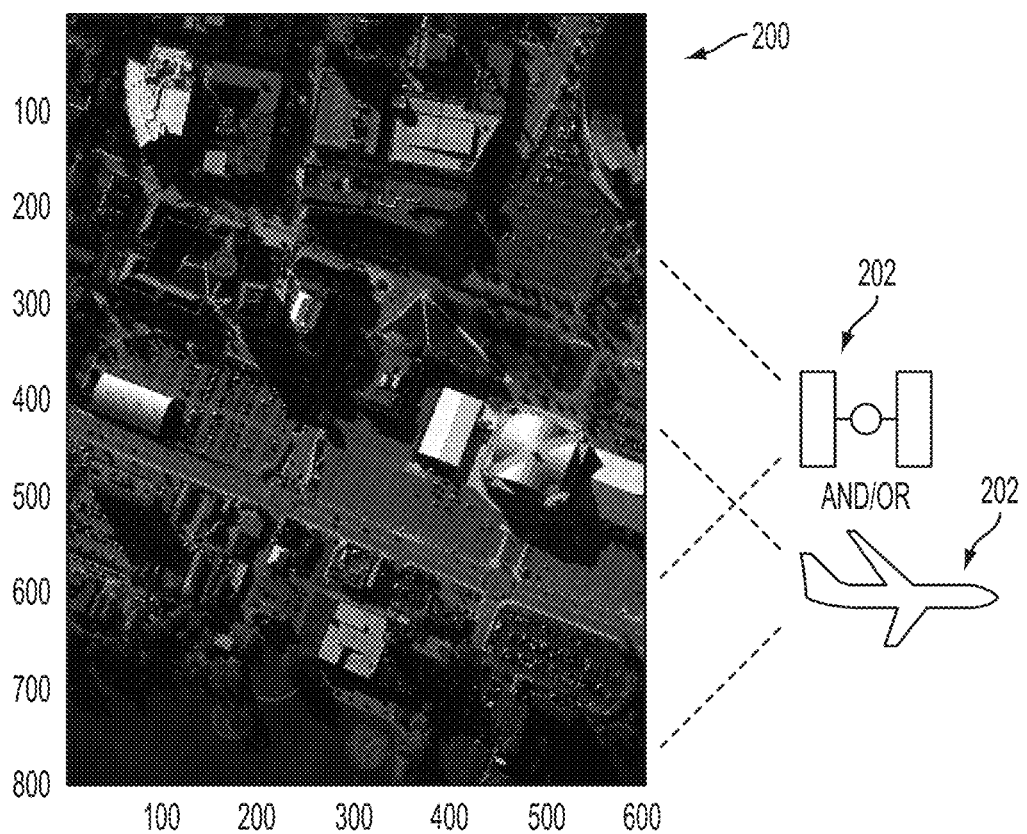
FIG. 2 shows an exemplary field of view of scene of FIG. 1, in accordance with an embodiment.

FIG. 2 illustrates field of view 200 of imaging platform 202 on a space based or airborne device (e.g., a satellite and/or an airplane, respectively), although the location of imaging platform 202 is not restricted to space or air and may alternatively ground based, subterranean, or submarine. Field of view 200 is a portion of interest of scene 100 that is captured by sensors or cameras on board imaging platform 202. Field of view 200 captures a movie (a video or video stream) that is a function of time, and FIG. 2 merely illustrates one snapshot in time of such a movie or video stream that captures scene 100 as time passes. In one embodiment, an operator of imaging platform 202 knows a direction of observation of scene 100 in advance. A plurality of such snapshots form the video or movie of scene 100 showing changes in positions of moving objects. Imaging platform 202 may be stationary or mobile such that a subsequent field of view may not be coextensive with initial field of view 200 at a later time in the exposure, or at the time of a later image capture by imaging platform 202.

Figure 3A:
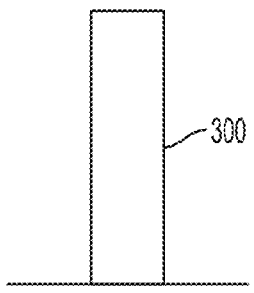
FIGS. 3A-3C illustrate the phenomenon of leaning of an example stationary object (a building) in the scene of FIG. 1, in accordance with an embodiment.
Figure 3B:
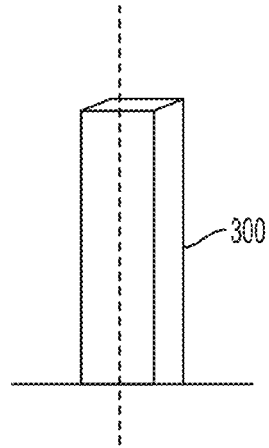
Figure 3C:
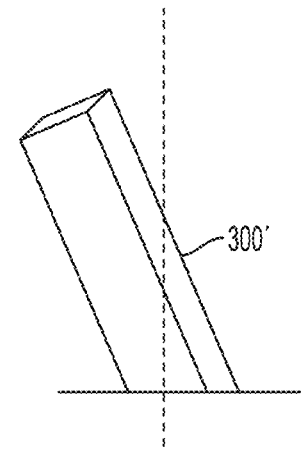

When imaging platform 202 is mobile, some stationary features of scene 100 may appear to move but do not actually move. Such stationary features of scene 100 are known as "leaners" or "leaning objects." FIGS. 3A-3C illustrate an example of a leaning object (a building in this example) in images taken from an aerial imaging platform 202 moving at a velocity and having a camera for capturing scenes (e.g., scene 100). The camera is pointed to, or trained on (i.e., focused on) the building to take images thereof as the imaging platform 202 moves. In many cases, the trajectory or direction of travel of imaging platform 202 may be determined, for example, based on a predetermined course or from measurement devices on-board imaging platform 202 (e.g., Global Positioning System or an integrated inertial navigation system). Similarly, the orientation of the camera with respect to imaging platform 202 may be known, prior to observation of scene 100.

FIG. 3A illustrates a side view of exemplary building 300. FIG. 3B shows a first image of building 300 taken from the camera looking downwardly at the building. In this image, substantially little of any of the sides of the building is visible. Building 300 appears generally parallel to an imaginary (dotted) line drawn from an overhead sensor aboard imaging platform 202 to the base of the building.

FIG. 3C shows a second image taken of building 300' some time later from the camera after aerial imaging platform 202 has moved from its position when the first image shown in FIG. 3A was taken. The dotted line shows the line of sight from the sensor to the base of the building. Some of the side portion of building 300' in the direction that image platform 202 is moving is visible in the image.

FIG. 3C shows the second image transformed by the freezing process to match the first image as closely as possible for the ground plane. Building 300' appears skewed or leaning from an imaginary (dotted) line drawn in a direction perpendicular to the base of building 300'. This is because camera is no longer looking at building 300 from the same vantage point (i.e., looking toward building), but from a slightly different vantage point (i.e., now from the right of the building). As such, building 300' appears to "lean" slightly away from the direction of movement of imaging platform 202. Building 300' is not actually leaning, but only appears to be leaning due to change in position of imaging platform 202. According to an aspect of the disclosure, this deterministic leaning is not removed during the image transformation, but rather may be used for determining the presence of a static object and also to retrieve a height, an elevation, or other three-dimensional information associated with a tracked target. In some instances, the degree (i.e., the amount or angle) of lean along a predicted deterministic path or track of motion of imaging platform 202 may be proportional to the height, elevation, or other three-dimensional information of a target associated with scene 100. Such leaning features of scene 100 are different from actual moving features or "movers" in scene 100, as will be discussed below. Additional description of leaners may be found in U.S. patent application Ser. No. 12/908,540, entitled "CORRECTING IMAGE DISTORTION FOR THREE DIMENSIONAL (3-D) PERSISTENT OBSERVATIONS," filed Oct. 20 2010, incorporated by reference herein in its entirety.

Figure 4:
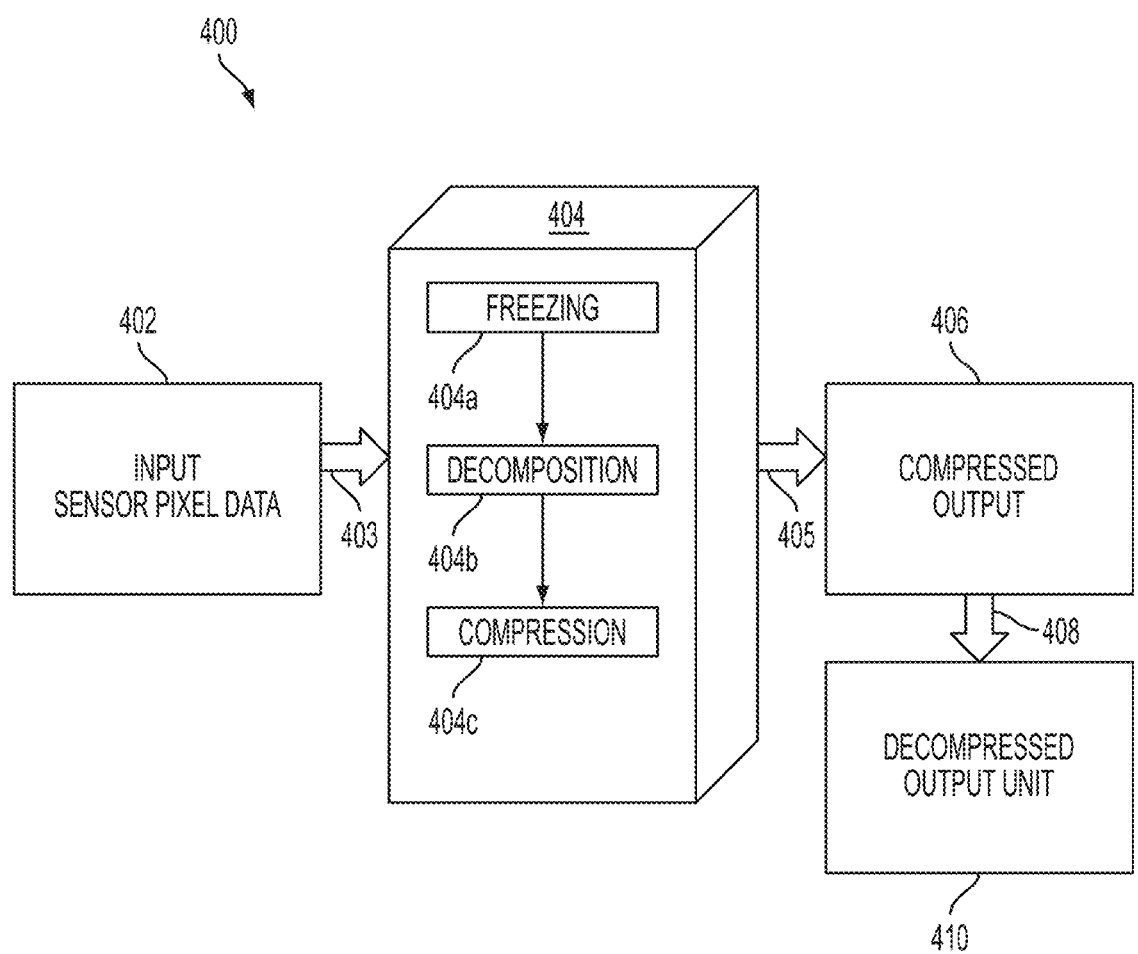
FIG. 4 illustrates an image processing system, in accordance with an embodiment.

FIG. 4 illustrates image processing system 400 configured to decompose and compress images received at imaging platform 202 that make up the portion of scene 100 captured by field of view 200. Compressed images of scene 100 may be stored and/or transmitted from image processing system 400 for further processing depending upon specific applications. Decomposition of scene 100 means that each frame of imagery is decomposed into background pixels, mover pixels, and leaner pixels. Background pixels are static and do not appear to move. Leaner pixels are pixels of portions of the scene above the ground plane, and do not move in reality but appear to move from frame to frame. As discussed above, the leaning motion is deterministic in direction given a pixel's location in the scene and the flight path and pointing angles of the camera on imaging platform 202. The rate of lean is proportional to the height of the pixel. Movers are those pixels in the scene that change position from frame to frame (e.g. vehicles, dismounts) but are not leaners.

In one embodiment, the background pixels are spatially compressed using one of many possible techniques known in the art such as JPEG-2000. The spatial compression amount may be selected by the user. Factors of two to three times (2-3×) may usually be obtained for mathematically lossless compression. Compression of as much as 10-20× may be selected depending on the user's requirements and tolerance for loss in the background. The mover pixels are identified and transmitted in parallel with the compressed background. By way of example only, the mover pixels are typically 0.1-1% of all pixels in scene 100. In one embodiment, these mover pixels may not be compressed. "Decompression" of the ensemble is executed by overlaying the mover pixels from each image on top of the decompressed background image of scene 100.

In one embodiment, the rate of motion of the leaner pixels is determined and converted to a height estimate. This height estimate is transmitted along with the background image and the movers, for example, in a file. The decompressed image may be annotated or color coded for height. In some embodiments a group of contiguous leaner pixels may be segmented and then labeled as a leaning object. In this case, a spatial compression algorithm may be applied to the height values of the object. The compressed values are transmitted along with the background image and movers and are decompressed prior to labeling or color coding for height.

In one embodiment, a local region of pixels (referred to as a "chip" or "image chip") around each mover is selected and transmitted with the static background image. Each chip may be transmitted in its original form or it may be compressed using a known spatial compression technique, such as those discussed above.

Image processing system 400 includes input sensor pixel data unit 402, image processor 404, and image output unit 406, among other hardware components, as described in the following paragraphs. In one embodiment, such hardware components may be standard computer processor(s) coupled with digital memory device(s) or other computer readable media (tangible and/or non-transitory) with instructions thereupon to cause the processor(s) to carry out the steps associated with features and functionality of the various aspects of this disclosure.

Input sensor pixel data unit 402 includes a plurality of sensors that capture a plurality of frames making up field of view 200 of scene 100. Each frame captured is stored as a pixel array or matrix in a memory of input sensor pixel data 402. Such captured data is typically received at data rates in the range of hundreds of Mega-bits per second (Mbps) to Giga-bits per second (Gbps). Since such capturing of images is known to one of ordinary skill in the art, it will not be described herein. Captured images in the form of pixel data stored in input sensor pixel data 402 is provided over communications channel 403 to image processor 404. Examples of sensors include, but are not restricted to, cameras, charge coupled devices, and the like.

Image processor 404 is configured to receive input sensor pixel data from input sensor pixel data unit 402 for processing. Image processor 404 includes image freezing module 404a, decomposition module 404b, and image compression module 404c, in addition to other hardware components including microprocessors configured to execute one or more instructions residing on memory devices in image processor 404, which when executed by the microprocessors cause the image processor 404 to carry out various image processing functionalities described herein. Image freezing module 404a, decomposition module 404b, and image compression module 404c are described below. Output from image processor 404 is provided to image output unit 406 over communication channel 405. Advantageously, in one embodiment, compressed output data from image processor 404 is provided at substantially lower data speeds in the range of sub-1 Mega-bits per second (Mbps), as compared to input data provided by input sensor pixel data unit 402 in the Gbps range.

Image output unit 406 may be a visual display unit or another image processing unit that prioritizes processing of data based upon specific applications. By way of example only, image output unit 406 may be a memory unit or a transmitter depending on how compressed output of image processor 404 is to be processed.

Figure 15:
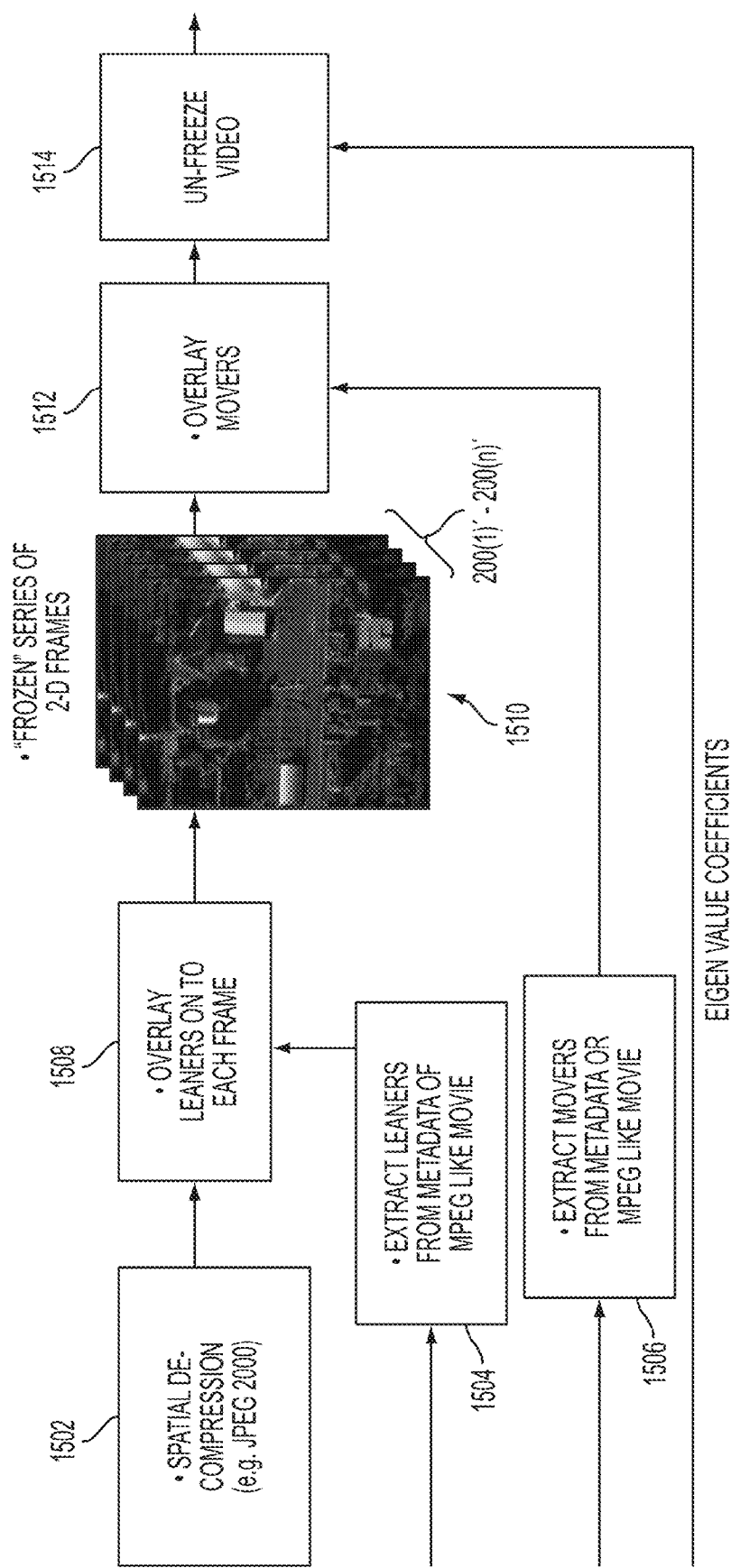
FIG. 15 illustrates and example of compression, in accordance with an embodiment.

In one embodiment, compressed output 406 of image processor is transmitted over communication channel 408 to decompressed output unit 410 to reproduce a decompressed version of images captured by imaging platform 202. An example of decompression carried out by decompression output unit 410 is described with reference to FIG. 15.

Figure 5:
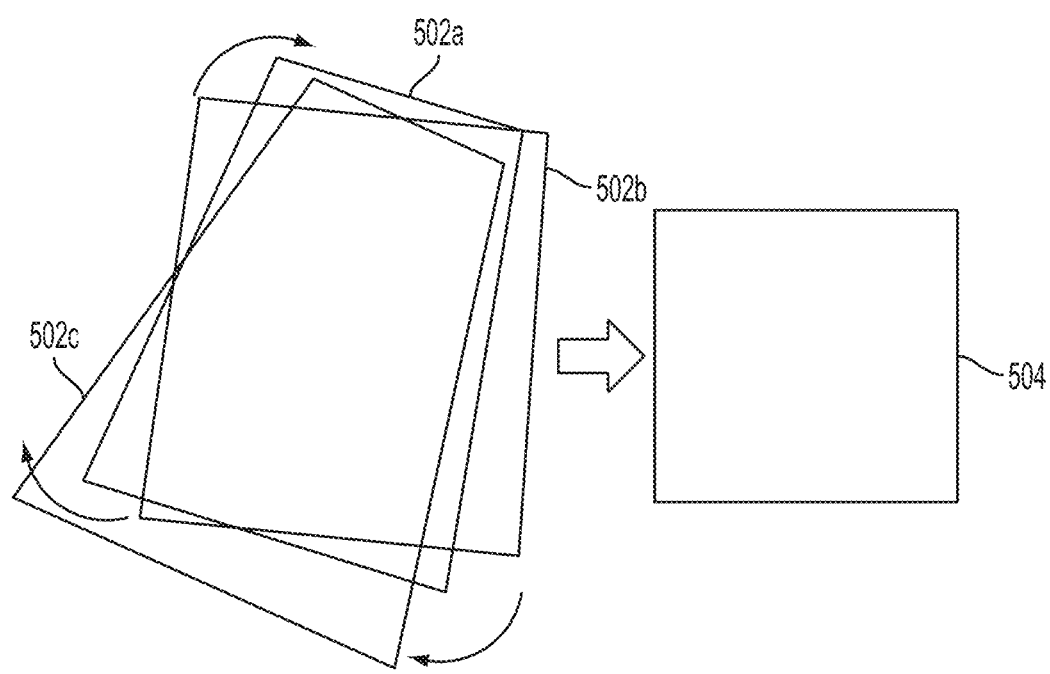
FIG. 5 illustrates the conventional technique of freezing used for image processing.

FIG. 5 illustrates an exemplary function of freezing carried out using image freezing module 404a. Frame to frame changes between images of scene 100 captured using field of view 200 are removed using image freezing module 404a. In an embodiment, optical flow eigenfunctions are used to compute and remove such frame to frame changes such that scene 100 appears to be collected from imaging platform 202 that is stationary and not mobile. For example, in FIG. 5, frames 502a-502c corresponding to field of view 200 of scene 100 appear rotated relative to each other. Upon processing by image freezing module 404a, a "frozen" image frame 504 is obtained that removes relative movement between image frames 502a-502c arising due to motion of imaging platform 202. In an embodiment, image frames 502a-502c may be consecutive frames in series separated by equal time intervals. In another embodiment, image frames 502a-502c may be randomly timed and are not successively placed in series. Additional details of image freezing module 404a and generally, the process of freezing, for example using eigenfunctions, carried out by image freezing module 404a are provided in U.S. patent application Ser. No. 12/908,540, entitled "CORRECTING FRAME-TO-FRAME IMAGE CHANGES DUE TO MOTION FOR THREE DIMENSIONAL (3-D) PERSISTENT OBSERVATIONS" filed Oct. 20, 2010, which is incorporated by reference in its entirety herein.

Figure 6:
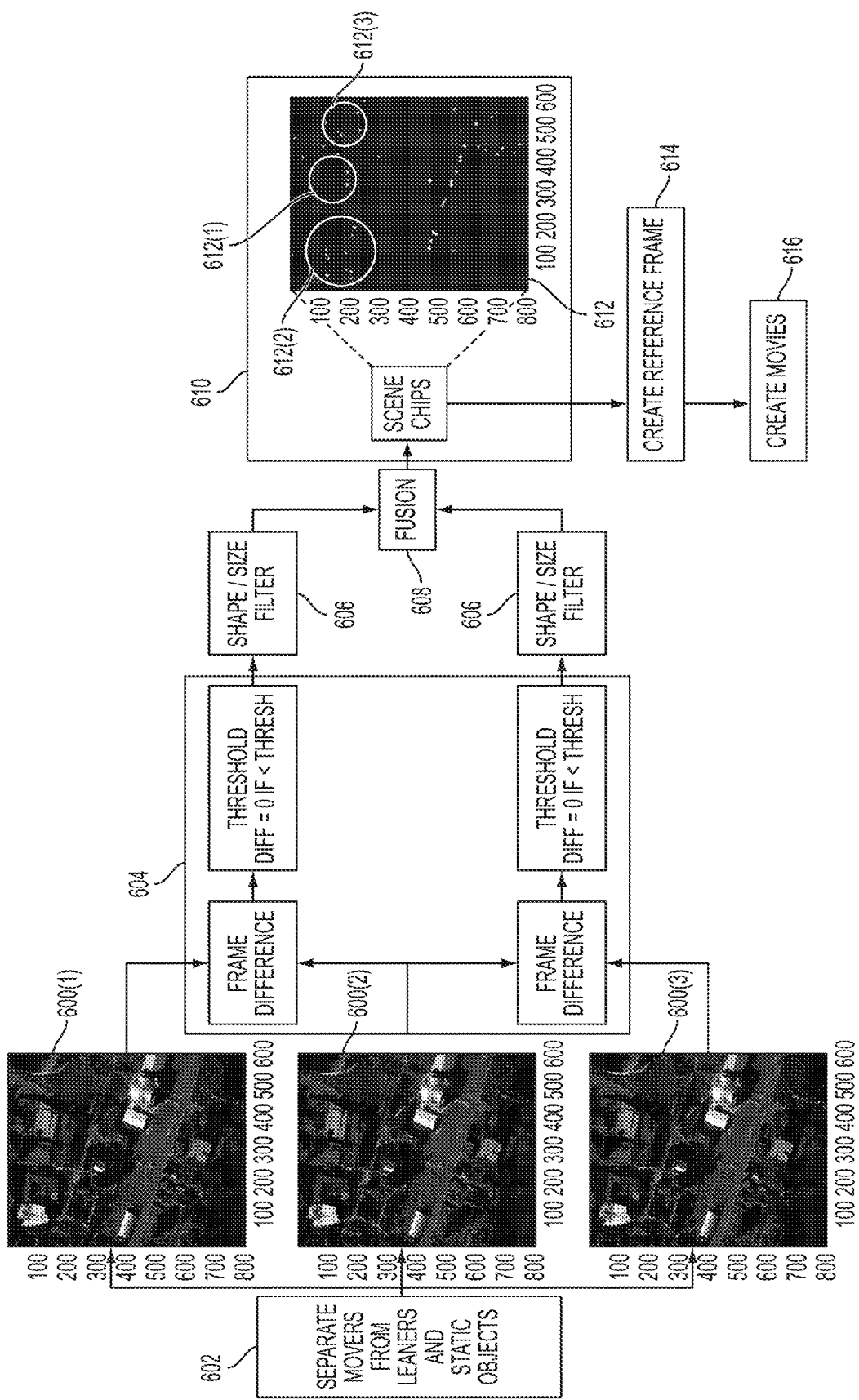
FIG. 6 illustrates identification and extraction of movers, in accordance with an embodiment.
Figures 8, 9:
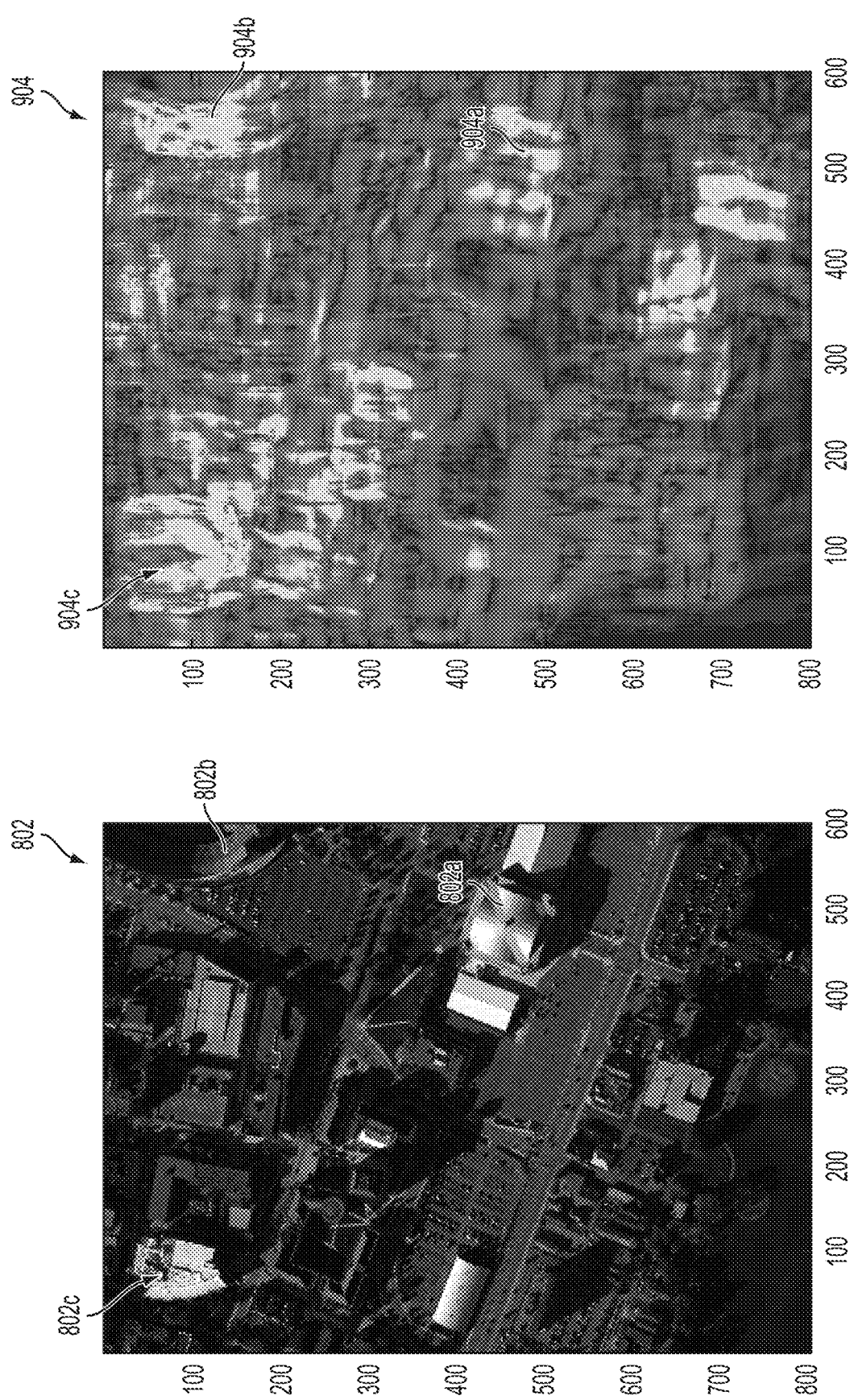
FIG. 8 illustrates an example of a frame identifying leaners, in accordance with an embodiment.
FIG. 9 illustrates an example of identification of leaner, in accordance with an embodiment.

Output of image freezing module 404a is provided to image decomposition module 404b. Image decomposition module 404b processes each frame to separate static pixels, leaners, and movers. Movers or mover objects are defined as objects in scene 100 that change their physical location and spatial orientation with time. Examples of movers are vehicles and people. The procedure carried out by decomposition module 404b is described using method 600 of FIG. 6, shown as a flowchart. Method 600 begins at step 602 where static (background) pixels, leaners, and movers are separated. Static components are those components that have little or no detectable motion from frame to frame, or are completely stabilized. In one embodiment, leaners may be detected using centroids of frozen frames and frame differences. Static pixels are what is left over after identifying movers and leaners or they are created by fading memory reference. The non-static pixels are categorized into either movers or leaners using, for example, a motion test. Pixels that change in consecutive frames are tested to determine whether the motion is indicative of leaning or other. Leaning motion is compared to a lookup table that indicates the direction of lean at a given location within field of view 200. Motion in any other direction may be inferred as not due to leaning. Motion may be tested in different numbers of consecutive frames (e.g., two frames, three frames, and the like). Scene to scene differences may be used to measure pixel change/motion. Scene gradients may be computed and their differences measured. Local centroids (centroids of pixel blocks or segments) may be computed and the motion of the centroids in consecutive frames may be measured. In one embodiment, a degree of correlation and motion of correlated features (original images and frame difference images) are measured to identify leaners. In one embodiment, a threshold on motion in direction of lean is carried out to identify leaners. In one embodiment, a threshold on degree of correlation is carried out to identify leaners. In one embodiment, original image results with frame difference may be combined or verified to ensure that shadows and periodic structures such as lines in parking lot are not misidentified, to identify leaners. In one embodiment, a technique to find and match edges combined with motion of top of an object may be used to identify leaners since the bottom doesn't move. By way of example only and not by way of limitation, results of identification of leaners is shown in FIGS. 8 and 9. In FIG. 8, original frame 802 with building 802a-802c identified as leaners 904a-904c in frame 904 after one or more techniques listed above have been applied to frame 802.

Figure 7:
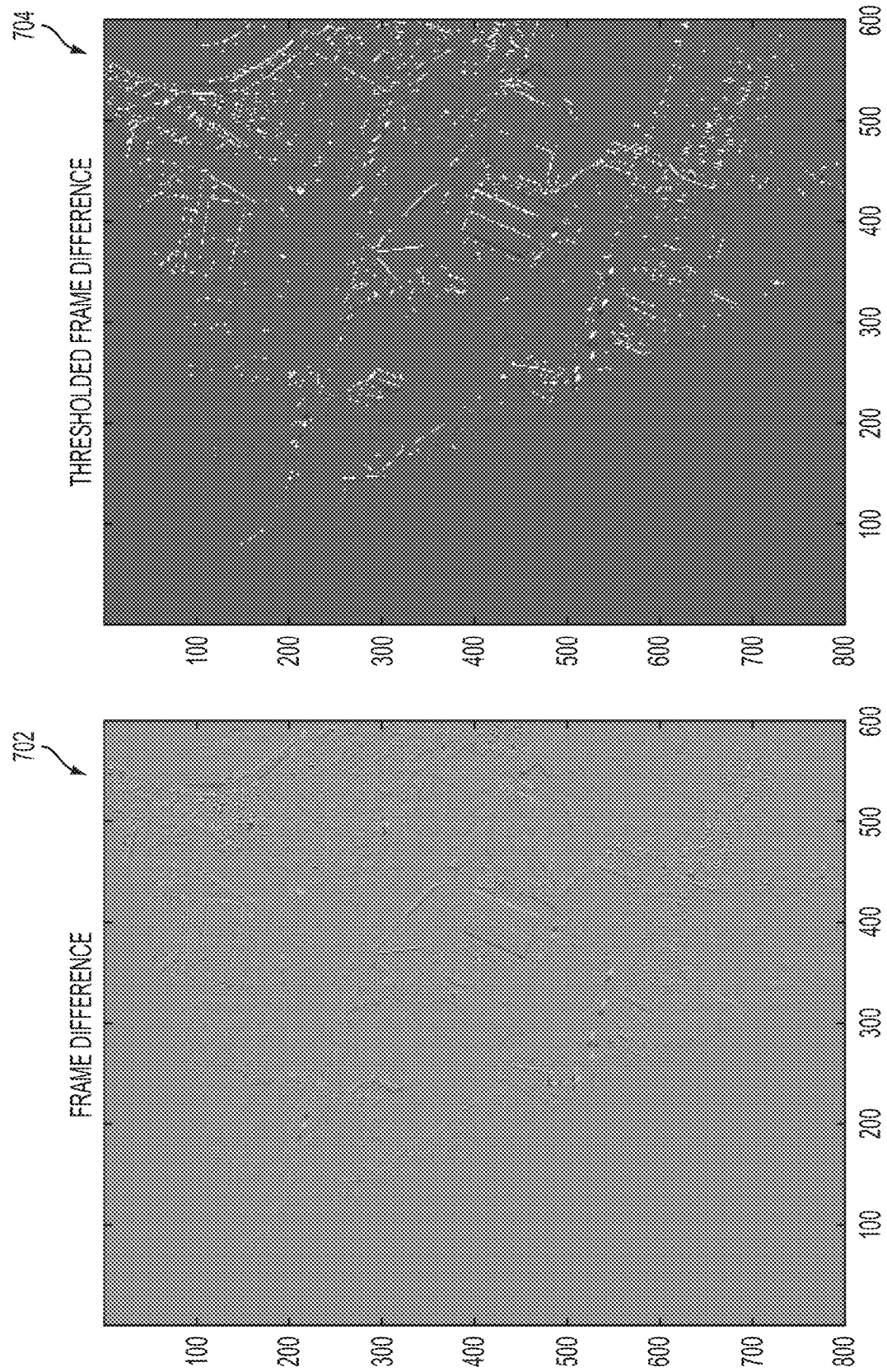
FIG. 7 illustrates an example of a difference frame, in accordance with an embodiment.

In step 604, frame differencing based upon thresholding is carried out. Frame differencing helps to show movers clearly, along with edges of leaners. In one embodiment, frame differencing is carried out between pairs of successive frames to detect changes between the two successive frames. For example, a threshold value may be compared to an average frame brightness of the two successive frames to result in a difference frame. By way of example only and not by way of limitation, FIG. 7 illustrates exemplary difference frame 702 formed from multiple frames of field of view 200 of scene 100. Difference frame 200 is compared against threshold difference frame 704. It is to be noted that although two frames are being described for computing the difference frame, in one embodiment more than two or several frames may be used. Frame differencing may be carried out pixel by pixel or centroids may be computed prior to or after the differencing operation.

Figure 10:
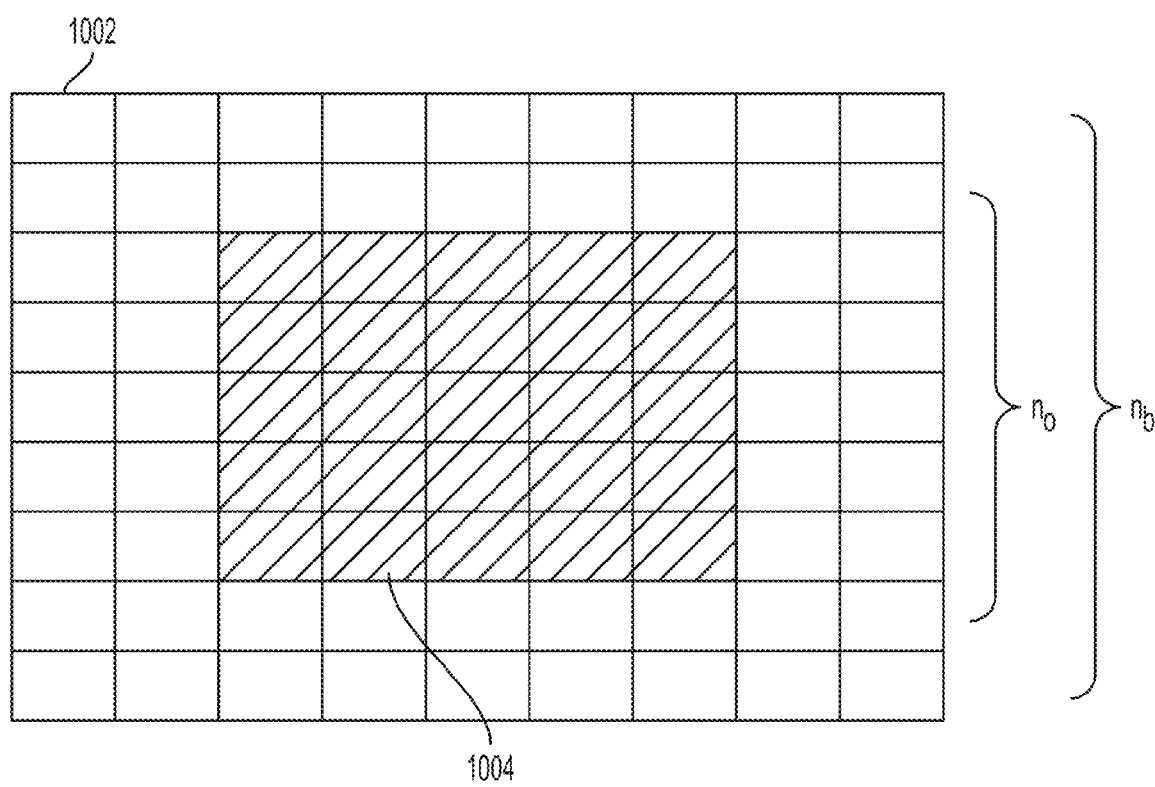
FIG. 10 illustrates an example of applying filtering to select movers, in accordance with an embodiment.
Figure 11:
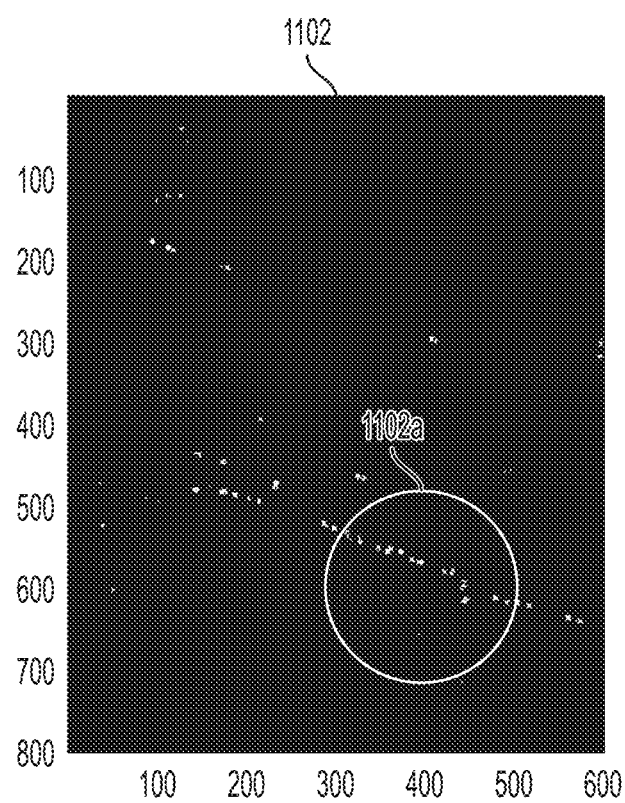
FIG. 11 illustrates an example of applying thresholding to identify movers, in accordance with an embodiment.

In step 606, movers are selected using shape and size filtering. Shape and size filtering is described in FIG. 10. Generally, for shape and/or size filtering, small blobs in frames are accepted and long lines are rejected. The technique involves specifying square object box 1004 of $n_o$ pixels and square background box 1002 of $n_b$ pixels. Positive and negative frame differences are convolved separately for each box using a formula for cumulative difference (CumDiff) given by equation (1):

$$CumDiff = \sum_{object\ box} Fdiff - \frac{n_o}{(n_b - n_o)} \sum_{Background\ box} Fdiff \quad (1)$$

where Fdiff=frame difference (positive/negative separately) and $n_o$, $n_b$ are linear dimensions of object box 1004 and background box 1002, respectively. Linear scaling implies background contribution of a line will cancel the object box contribution, with CumDiff=0. A larger blob will have a larger background contribution with CumDiff<0. Applying the threshold on CumDiff yields movers. FIG. 11 illustrates an example where threshold values of cumulative frame difference yield detections of movers as shown in frame 1102a with edges corresponding to leaners substantially removed.

In step 608, fusion of difference frames from at least two different pairs of frames is carried out. For example, in FIG. 6, frames 600(1)-600(3) are consecutive frames. A first difference frame is calculated from pair of frames 600(1) and 600(2) and a second difference frame is calculated from pair of frames 600(2) and 600(3). The first and second difference frames are fused into a single difference frame at step 610. During fusion, movers in given frame(s) (e.g., frames 600(1)-600(3)) are determined by comparing frame differences calculated in step 604 with previous and subsequent frames. In successive frames, object(s) appearing or disappearing will result in change of contrast in two frame differences, and aids in identifying and extracting movers.

Figure 12:
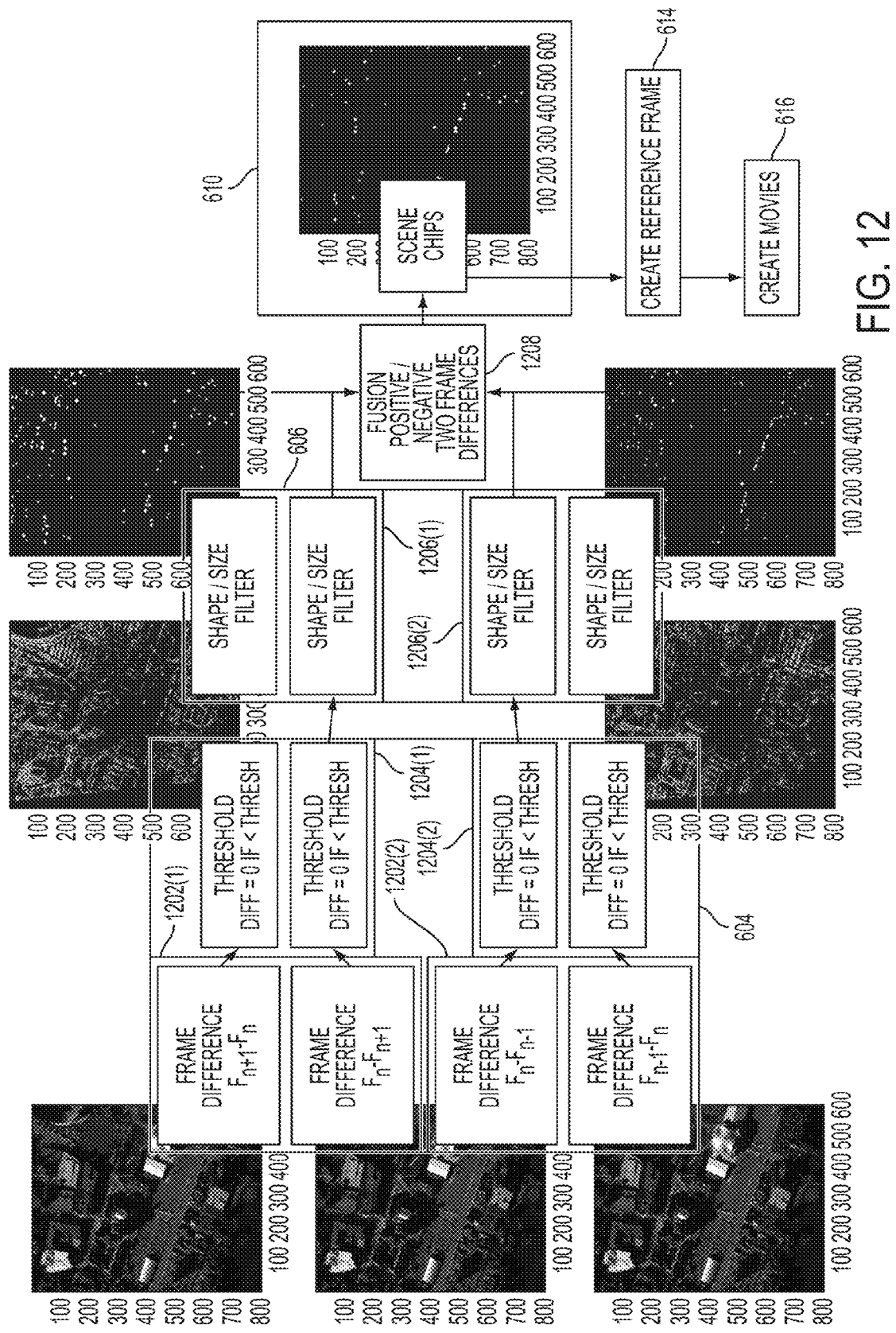
FIG. 12 illustrates an example of frame differencing, in accordance with an embodiment.

In one embodiment, for example, as shown in FIG. 12 a further refinement of the fusion step 608 of FIG. 6 may be carried out. In FIG. 12, frame differencing step 604 of FIG. 6 is split into two where first pair of difference frames 1202(1) and second pair of difference frames 1202(2) is calculated as described below.

First pair of difference frames 1202(1) includes a first difference frame that is a positive difference of frames 600(1) and 600(2) and a second difference frame that is a negative difference of frames 600(1) and 600(2). Similarly, second pair of difference frames 1202(2) includes a first difference frame that is a positive difference of frames 600(2) and 600(3) and a second difference frame that is a negative difference of frames 600(2) and 600(3). Thresholding is applied to each difference frame in first pair of difference frames 1202(1) and 1202(2) in steps 1204(1) and 1204(2), respectively. Step 606 is carried out for each difference frame as shown in steps 1206(1) and 1206(2). Step 608 is refined into fusion step 1208 where two frame differences, positive and negative, are created as fusion frames. Positive differences show where a pixel or object has moved and made the intensity brighter. Negative differences show where a pixel has moved and reduced the intensity. For example, vehicles moving on a dark road result in positive changes for the new location of the vehicle and negative changes where the vehicle previously was located. Remaining steps of FIG. 12 are the same as FIG. 6.

Referring back to FIG. 6, in step 610 scene chips are created from fused difference frames that identify movers from frozen leaners and other static objects. Scene chips are small blocks of pixels around a moving pixel or object. The size of scene chips may be user selected. For example, frame 612 is formed from scene chips show movers 612(1), 612(2), and 612(3) corresponding to moving vehicles in field of view 200 of scene 100.

Figure 13:
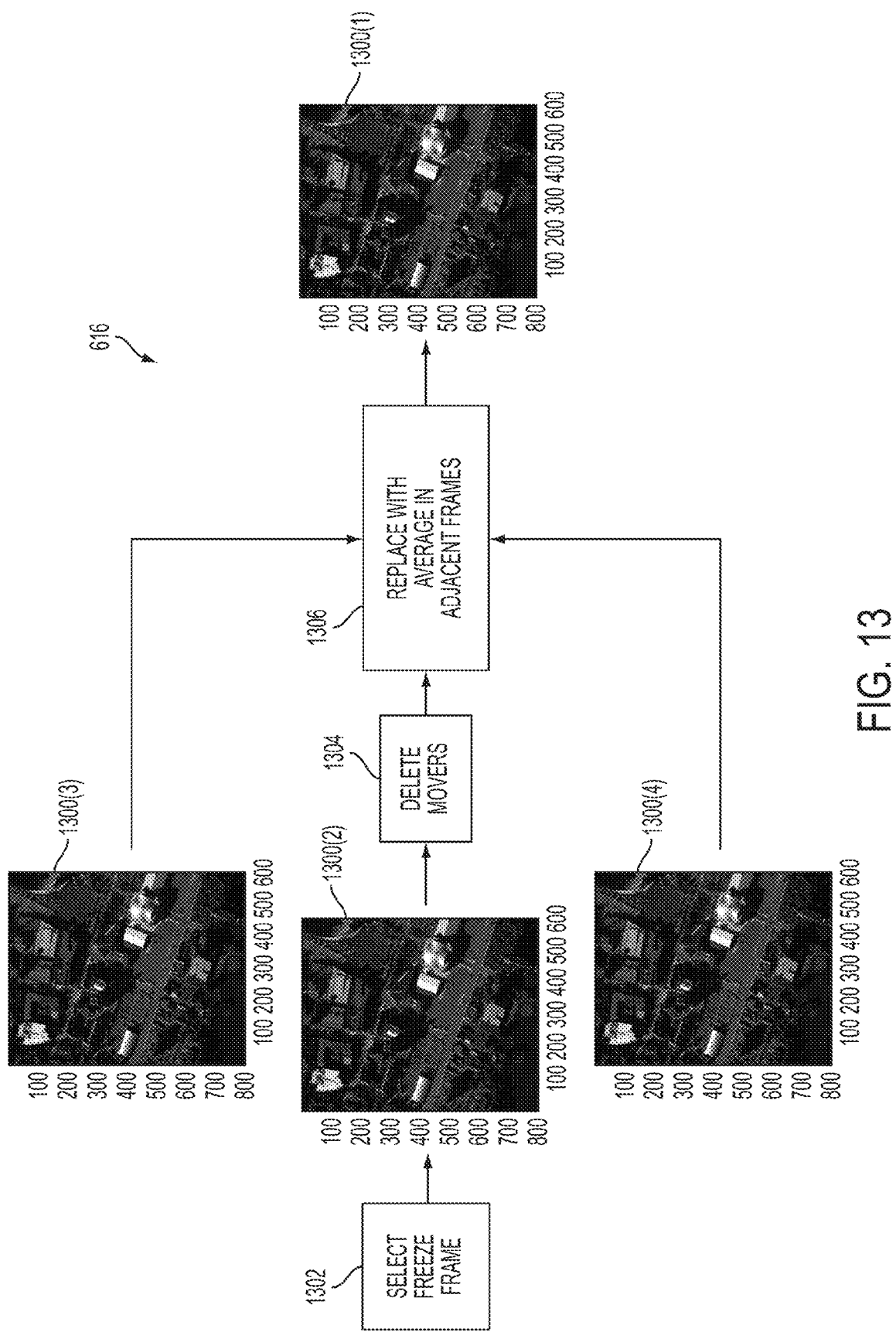
FIG. 13 illustrates an example of a construction of a reference frame, in accordance with an embodiment.

Once movers have been identified and extracted, in step 614, reference or background scene or frame from selected "freeze frame" with movers removed and replaced with background from adjacent frames is created. Such construction of reference frame according to step 614 is illustrated in FIG. 13. Reference frame 1300(1) includes all scene artifacts except movers. To create reference frame 1300(1), in step 1302, a user of image processor 404 selects freeze frame 1300(2) as a baseline background frame. In step 1304, movers are removed based upon their extraction and are replaced with background from nearby frames 1300(2) and 1300(3) where the background pixels are not movers. In one embodiment, to create reference frame 1300(1), for example, pixels corresponding to movers' previous locations are replaced with interpolated intensity values from surrounding pixels in that frame or an average of pixels in a series of frozen frames (FIG. 13 describes the latter). In step 1306, upon averaging between two such successive frames (1300(2) and 1300(3)), where one of the frames does not have any movers, reference frame 1300(1) without movers is created. In one embodiment, multiple frames, i.e., more than three frames, may be used to create reference frame 1300(1). For example, three widely separated frames could be used such that two out of the selected three frames that are in closest agreement may be averaged. In one embodiment, mover history may be kept in each pixel but a value prior to or after movement of the pixel object may be used. In one embodiment, only a single reference frame may be transmitted for processing using one or more processors of a computing device. In one embodiment, lossless spatial compression may be applied to the reference frame 1300(1) whereas lossy spatial compression may be applied to other frames (e.g., a frame that includes mover objects).

Referring back to FIG. 6, after creation of reference frame 1300(1) in step 614, image processor 404 creates two movies or two video streams, although a higher number of movies or video streams could also be created. One movie includes pixel intensity values for pixels identified as movers, and has zero valued pixels elsewhere. The second movie includes scene pixel intensity values for pixels identified as movers, and has reference frame values elsewhere. With creation of movies, the decomposition process carried out by decomposition module 404b of image processor 404 is completed. Output of decomposition module 404b is provided to compression module 404c where compression of the movies is carried out, as described below. As discussed above, compression of reference frame 1300(1) that does not include movers at all may be carried out using standard compression techniques. Further, movers may be stored in a separate file (referred to as a track file) that may be sent over channel 408. Such a track file, for example, may store vector data (e.g., position vectors) indicative of motion of movers with respect to time, along with other data associated with movers. In one embodiment, only a single reference frame (e.g., reference frame 1300(1)) may be sent along with data related to multiple movers in a separate track file for processing.

Figure 14A:
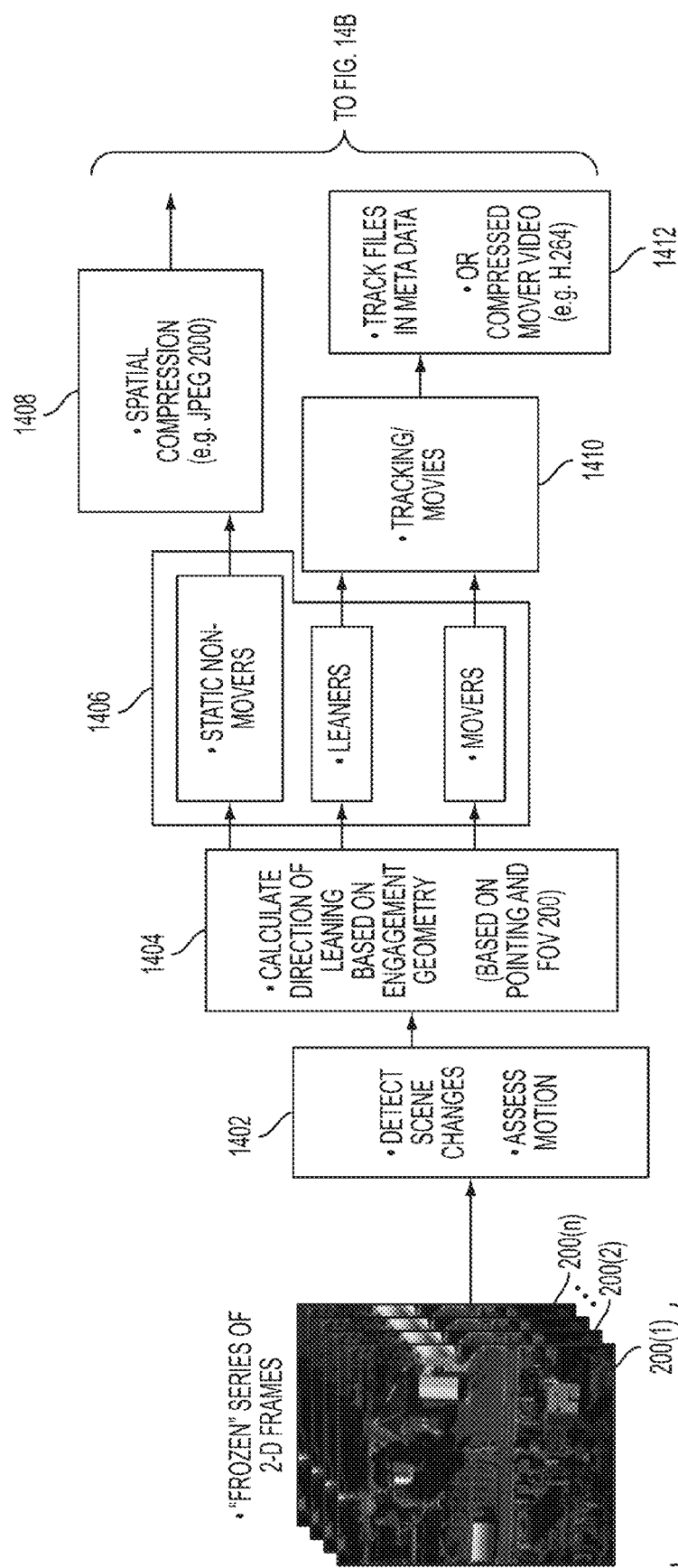
FIGS. 14A and 14B illustrate compression and decompression, respectively, in accordance with an embodiment.
Figure 14B:
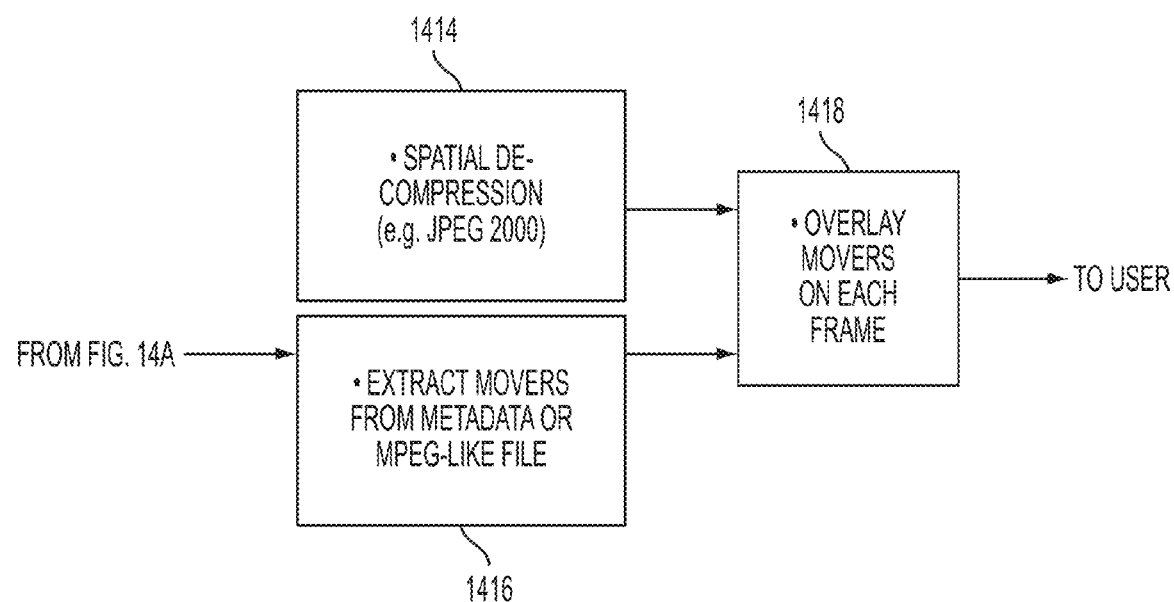

FIGS. 14A and 14B illustrate an embodiment of compression and de-compression, respectively, of movies created in FIG. 6. In FIG. 14A, after the movies created in FIG. 6 have been frozen into a plurality of frames 200(1)-200(n), n being an integer, each illustrating a point in time snapshot of field of view 200 of scene 100, in step 1402, image processor 404 detects scene changes between different frames 200(1)-200(n). Based upon detected scene changes, compression module 404c assesses motion information in field of view 200. As described above, reference frame or background scene 1300(1) is spatially compressed (and later decompressed) using prior art spatial compression such as JPEG-2000. Mover pixels may be uncompressed or compressed using prior art motion compression such as MPEG4. Mover pixels may be replaced by scene chips, each of which may be spatially compressed or the ensemble may be compressed using motion compression. Movers may be replaced by track files indicating positing and bearing versus time (or other kinematics). Leaners may be identified by a tag and their motion catalogued by pixel, by centroids, by feature, or by segment. At decompression leaners are annotated or color coded for height.

In step 1404, image processor 404 calculates a direction of leaning based on engagement geometry (i.e., based on pointing direction of imaging platform 202 and field of view 200).

In step 1406, compression module 404a separates out static non-movers, leaners, and movers as obtained from the movies or video streams in decomposition module 404b.

In step 1408, compression module 404c applies spatial compression of static non-mover objects. By way of example only and not by way of limitation, spatial compression may include compression techniques such as JPEG 2000, or other static image compression techniques known to one of ordinary skill in the art.

In parallel, in step 1410, the moving pixels are segregated by pixel, track file, and, optionally, the moving pixels are identified as mover or leaner.

In step 1412, meta-data information associated with leaners is stored in files for transmission and/or compression followed by transmission. In this respect, the term "transmission" may be associated with source coding, or with channel coding of the channel used for transmission, and aspects of this disclosure are not limited by whether compression is done at source (i.e., at imaging platform), or during transmission accounting for transmission channel artifacts. By way of example only and not by way of limitation, metadata information includes the time of each image frame, the position of imaging platform 202, the position of the four corners of the image, the velocity of imaging platform 202, the angle rates of any pointing system, and the like. In addition, in step 1412, only the movie or video stream including movers (created in step 616 of FIG. 6) is compressed using video compression techniques such as H.264. Advantageously, since only the movie or video stream including movers is compressed using video compression, substantial computational and bandwidth savings are obtained. Therefore, separate compression rates and techniques are applied to static pixels, leaner objects, and mover objects.

During decompression, for example, as shown in FIG. 14B, at a receiver or at another processor used to obtain field of view 200, steps 1414 and 1416 are carried out in parallel. In step 1414, spatial decompression of static pixels is carried out, in accordance with compression technique used at compression module 404c. In step 1416, information about movers is extracted from metadata or a video file compressed according to step 1412. In step 1418, decompressed video corresponding to movers is overlaid on each frame including static objects and leaners to reconstruct original field of view 200.

In an alternative embodiment, in step 1402, instead of assessing motion in field of view 200, a motion vector is assigned to each moving pixel in each frame 200(1)-200(n). Further in this embodiment, the compressed mover video of step 1412 is created using eigen-value coefficients obtained from processing of motion vectors assigned to each pixel of frames 200(1)-200(n). In this embodiment, decompression and reconstruction of field of view 200 is then carried out according to FIG. 15 where steps 1502, 1504, and 1506 are carried out in parallel.

In step 1502, similar to step 1414 of FIG. 14B, spatial decompression of static objects is carried out. In step 1504, leaners are extracted from metadata or from the decompression of movies created in step 616. In step 1506 movers are extracted from metadata or from the movies created in step 616.

In step 1508, leaners extracted in step 1504 are overlaid on decompressed static objects images. In step 1510, the overlaid frames are used to create frozen series of frames 200(1)'-200(n)'. In step 1512, movers extracted in step 1506 are overlaid on frozen frames 200(1)'-200(n)' that does not have movers. In step 1514, unfrozen video is created to reconstruct scene 100 using eigen-value coefficients provided from step 1412. By way of example only, use of eigenvalue coefficients is described in U.S. patent application Ser. No. 12/908,540, entitled "CORRECTING IMAGE DISTORTION FOR THREE DIMENSIONAL (3-D) PERSISTENT OBSERVATIONS," filed Oct. 20, 2010, incorporated by reference herein in its entirety, and will not be described in detail herein. In an alternative embodiment, step 1514 is optional.

Figure 16:
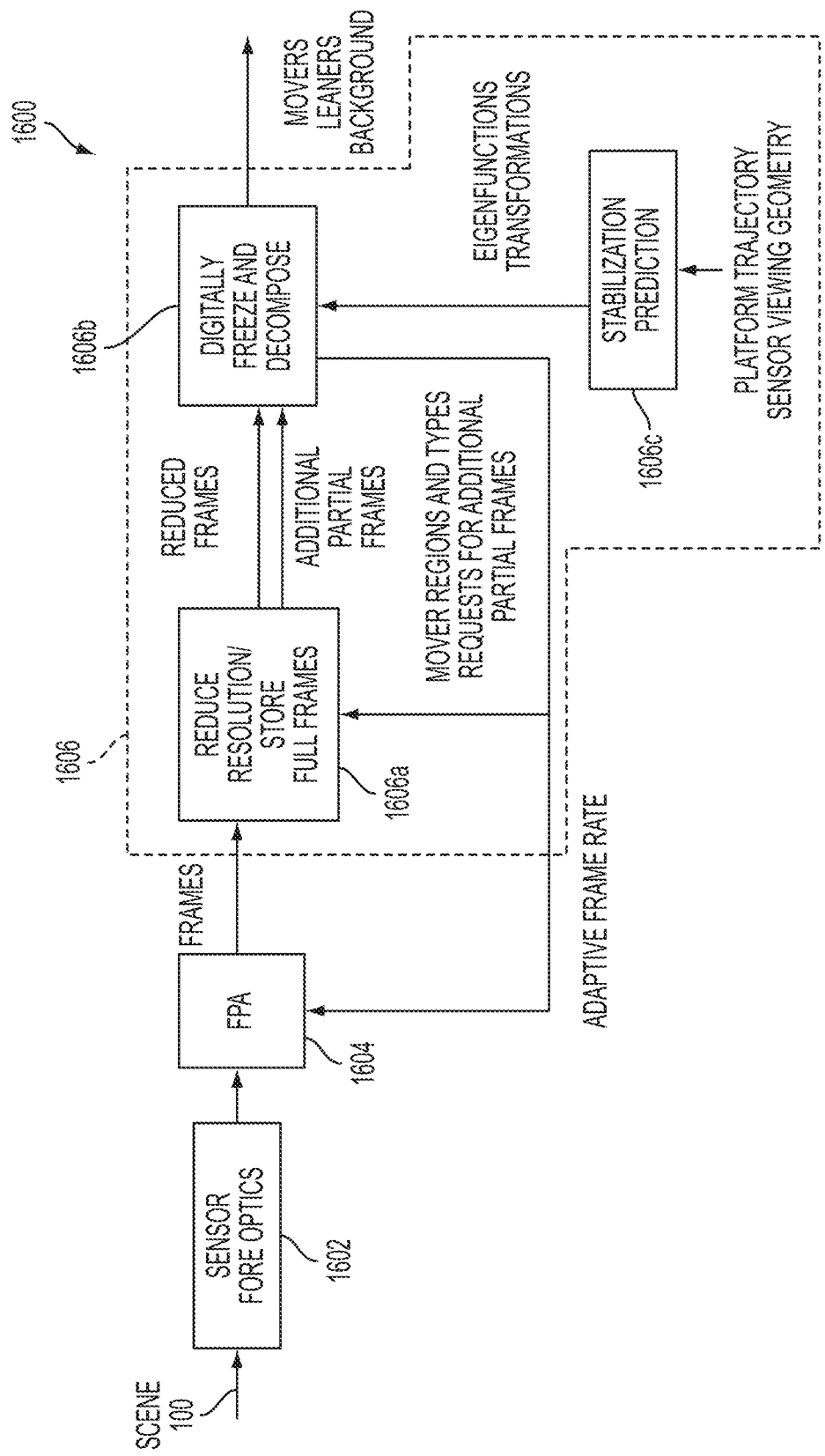
FIG. 16 illustrates a system for adaptively freezing frames, in accordance with an embodiment.
Figure 17:
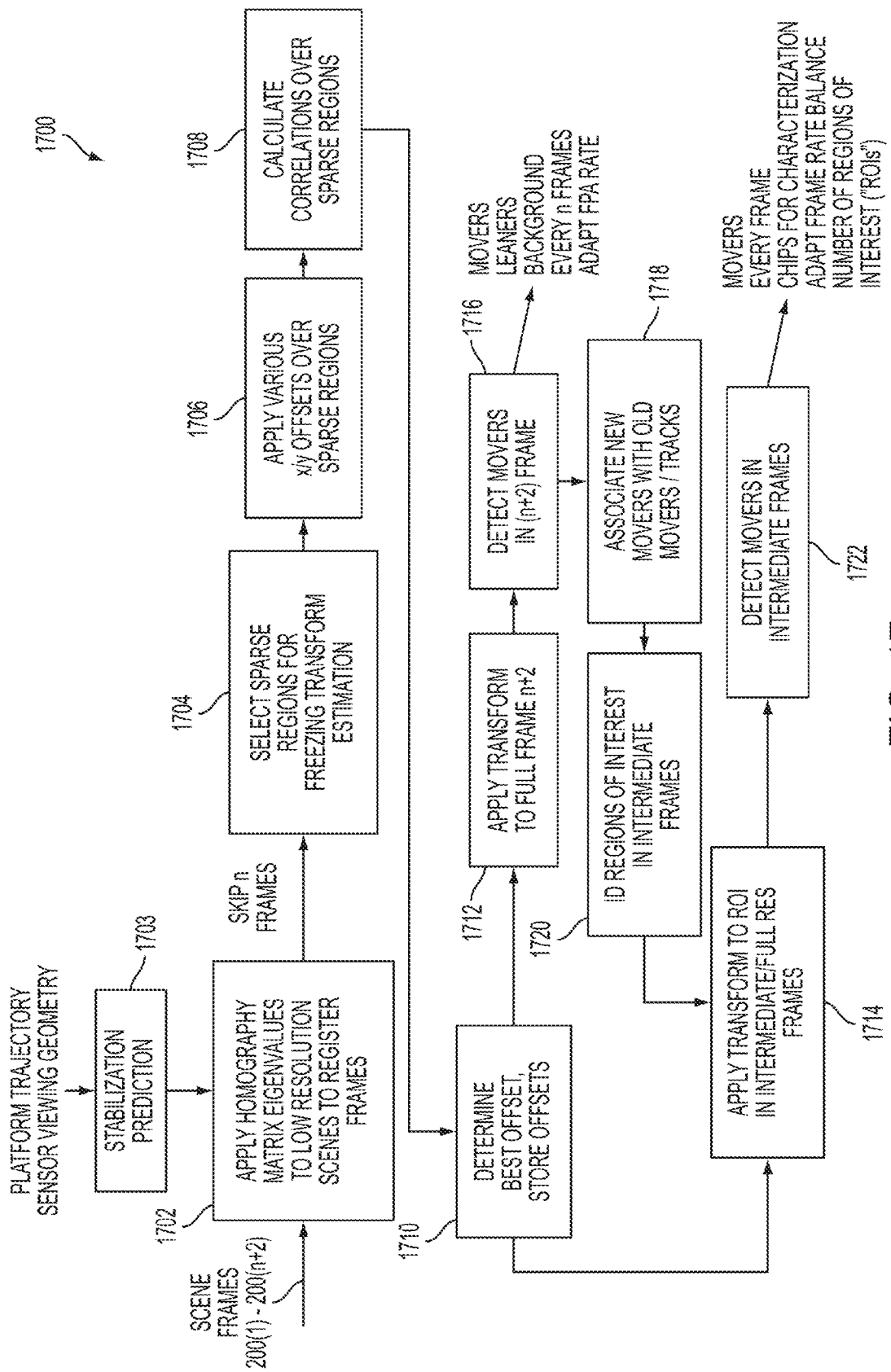
FIG. 17 illustrates a process for adaptively freezing frames, in accordance with an embodiment.

Referring to FIGS. 16 and 17, in one embodiment, the efficiency of processing movers, leaners, and other static or background pixels may be improved adaptively such that a minimum number of frames/pixels are frozen using the freezing process of FIG. 5. In this embodiment, all frames 200(1)-200(n) are collected and temporarily stored for potential use as needed by imaging platform 202. Initially, data may be frozen and decomposed at a reduced spatial/temporal resolution to determine if movers (e.g., vehicles and/or dismounts) are present. For each type of possible mover that is detected, the data local to an event would be retrieved at the higher/required temporal/spatial fidelity needed to characterize the event. Higher resolution temporal and spatial information could be frozen and decomposed local to each such event.

Referring to FIG. 16, system 1600 is a system for adaptively freezing frames 200(1)-200(n) resulting in additional processing gains. System 1600 includes sensor optics 1602 coupled to focal plane array (FPA) 1604, which is further coupled to computing device 1606. Computing device 1606, in addition to one or more processors or memory, includes frame storage module 1606a coupled to digital freeze and decompose module 1606b. Digital freeze and decompose module 1606b is further coupled to receive inputs from stabilization prediction module 1606c. Sensor optics 1602 aboard imaging platform 202 captures scene 100 and provides scene 100 to photodetectors in FPA 1604 to frames 200(1)-200(n). Frames 200(1)-200(n) are provided to frame storage module 1606a that is configured to temporarily store full frames 200(1)-200(n) as received from FPA 1604 and pass some of that information to digital freeze and decompose module 1606b, depending upon specific contents within frames 200(1)-200(n), such as the frame rate and spatial resolution, as well as parameters associated with a particular application (e.g., a military mission), such as mover size and velocity, which together determine the required spatial scale in image pixels and time scale in video frames. Reduced frames have reduced resolution either spatially (by summing neighboring pixels) or temporally (by skipping frames in the sequence). Frame storage module 1606*a* forwards reduced frames to digital freeze and decompose module that determines if there is any motion detected in the frames 200(1)-**200(*n*). Based upon the determination of motion detected, maximum rate of that motion is used to adaptively set the frame rate and is outputted to a control module (not shown) of FPA 1604 to ensure adequate collection of information on the fastest movers, without unnecessary information collection. In addition, the determination of motion is used to request additional information from frame storage module 1606***a*. These requests generate the partial frame information passed to the digital freeze and decompose module 1606*b*. The partial frame information may be full resolution spatially and/or temporally, but only for selected regions of interest, such as the location of movers in the reduced frames or the predicted location of movers in intermediate, skipped reduced frames. Frame storage module 1606*a* achieves reduced resolution and temporary storage. The feedback loop from the freeze and decompose module 1606*b* to FPA 1604 provides additional partial data to FPA 1604. In this way, the full spatial and temporal resolution may be used where it is needed, while processing is reduced by not using the full resolution where it is not needed. To perform such determination, digital freeze and decompose module 1606*b* receives eigen-functions and transformations from stabilization prediction module 1606*c*. These eigen-functions are used in the freezing process. Since such eigen-functions and transformations are described in U.S. patent application Ser. No. 12/908,540, entitled "CORRECTING IMAGE DISTORTION FOR THREE DIMENSIONAL (3-D) PERSISTENT OBSERVATIONS," filed Oct. 20, 2010, incorporated by reference herein in its entirety, and will not be described in detail herein.

Referring now to FIG. 17, an exemplary process 1700 describes a flow diagram for adaptive processing of compression rates, according to an embodiment. In this embodiment a homography transform is applied in step 1702 to $(n+2)^{th}$ frame in frames 200(1)-**200(*n*+2) to freeze the data relative to the first frame. Since homography transforms are known to those of ordinary skill in the art, they will not be described in detail herein. For example, adjusting the parameters of the homography transform by repeatedly applying different transforms to every pixel may be unnecessary. The correct transformation may be determined by testing a few areas spread across scene 100 or frames in field of view 200. These transforms may be determined after skipping several frames, e.g., an n number of frames 200(2)-200(*n*+1)**, where n is an integer value.

In step 1703, the stabilization prediction carried out by stabilization prediction module 1703*a* may be used to generate an approximate homography transform of step 1702 that freezes the background scene in frames 1 and (n+2). Because of expected errors in the homography transform, the transform may be varied slightly and a determination which transform to optimize the freezing be made.

In step 1704, sparse regions are selected in frames 1 and (n+2) to optimize the background freezing. Because subsequent steps 1706, 1708 and 1710 may be time consuming and because the entire background image is not necessary to optimize the freezing, processing may be significantly reduced without loss of performance. These regions are selected to be small regions of background pixels spread across the scene. Determining the optimum homography transform by applying them only to these selected background regions may reduce processing, while ultimately providing a high quality transform which may be applied to the whole scene 100 for good freezing and decomposition.

In step 1706, various X and Y coordinate offsets may be applied to the selected frames 200(1) and **200(*n*+2)** over all selected sparse regions of such selected frames. The quality of freezing may be evaluated for each offset to optimize freezing. This step may be carried out if the stabilization prediction is not accurate to the sub-pixel level that may be achieved by image correlation.

In step 1708, correlations over such sparse regions may be calculated using a computing device in order to select the combination of homography transform and X/Y offset with the best correlation as the optimum freezing transformation.

In step 1710, based upon such sparse region correlations, the best homography transform and X and Y coordinate offsets may be determined and stored in a memory device. These may be used to freeze the full frame in step 1712. In this way, only the optimum transform is applied to the full frame, while the sequence of transforms that has been tested was applied only to sparse regions of the frame.

In step 1712, the optimum homography transform and X/Y offsets are applied to the full $(n+2)^{th}$ frame to freeze it relative to the first frame.

In step 1716, movers are detected in the $(n+2)^{th}$ frame and first frame by comparing the two scenes. When movers are discovered in these "end" frames and the magnitude of the motion may be estimated, and regions of interest may be defined in the intermediate frames. Additionally or optionally, the frame rate for FPA 1604 may be adapted after every "n" number of frames, n being an integer value. If the motion of all relevant objects from one frame to the next is consistently small, the frame rate may be decreased; however, if the motion is large, the frame rate may be increased.

In step 1718, newly detected movers in the first and $(n+2)^{th}$ frame from step 1716 are associated with each other and may also be associated with old movers and/or track files associated with the old movers.

In step 1720, regions of interest in intermediate frames are identified. These regions of interest encompass the area by which each mover in the first frame may get to the associated mover in the $(n+2)^{th}$ frame. If there is too much ambiguity in the association or the mover path, the number of frames skipped, n, may be reduced.

In step 1714, homography transforms are applied to the regions of interest ("ROIs") in intermediate full resolution frames. If the observer motion is small or closely matches the stabilization prediction, the optimum transform for intermediate frames may be interpolated from that transform used to freeze the $(n+2)^{th}$ frame relative to the first frame. In some cases, additional variation of the transform and correlation of background portions of the scene may be needed to optimize the freezing and decomposition. Step 1714 combines the best transformation and offset information for background freezing from step 1710 with the selected regions of interest for movers from step 1720 to freeze the regions where movers are expected to be in the intermediate frames.

In step 1722, movers are detected in intermediate frames. Additionally, the images in these small groups of pixels comprise the scene chips which observe the movers in each frame. These chips may be used to characterize the moving objects. The frame rate may be adapted if large motion is causing ambiguities in the association of movers and the identification of intermediate regions of interest, or if small motion is causing unnecessary processing.

It is to be noted that various steps of the flowcharts discussed in the disclosure may be carried out using computing devices having processors, memory, buses, and ports to aid carrying out such steps. Alternatively, or additionally, such steps may be carried out by executing instructions residing upon non-transitory or tangible computer readable media using one or more processor devices. Further, steps of the flowcharts may be merged, skipped, or new steps added for specific applications in which various embodiments may be implemented, as may be contemplated by those of ordinary skill in the art after reading this disclosure.

Although the above disclosure discusses what is currently considered to be a variety of useful embodiments, it is to be understood that such detail is solely for that purpose, and that the appended claims are not limited to the disclosed embodiments, but, on the contrary, are intended to cover modifications and equivalent arrangements that are within the spirit and scope of the appended claims.

What is claimed is:

1. A method for processing images, comprising:
    receiving, at an image processor, a set of frozen images, the set of frozen images being obtained by removing apparent motion between images captured from a mobile imaging platform, the apparent motion arising due to motion of the mobile imaging platform and the images corresponding to a scene changing with time;
    decomposing, at the image processor, the set of frozen images to detect static objects, leaner objects, and mover objects in the scene, the mover objects being objects that change spatial orientation in the scene with time due to motion of the objects, and leaner objects being stationary features that appear to change spatial orientation in the scene with time due to motion of the mobile imaging platform; and
    compressing, using the image processor, the static objects, leaner objects, and mover objects in the scene separately using different compression techniques for storage and/or transmission.

2. The method of claim 1, wherein the decomposing comprises:
    creating difference frames from two or more successive frozen images in the set of frozen images;
    applying thresholding to the difference frames;
    filtering the static objects, the leaner objects, and the mover objects from the thresholded difference frames based upon at least one of a shape and a size of the static objects, the leaner objects, and the mover objects; and
    creating, at the image processor, a first video stream comprising only pixels identified as the mover objects and a second video stream comprising the mover objects and pixels not identified as the mover objects in the scene.

3. The method of claim 2, wherein the compressing is performed separately for the first video stream and the second video stream at respective different rates of compression.

4. The method of claim 2, wherein the creating the difference frames comprises creating positive and negative difference frames and the thresholding followed by the filtering is applied to each of the positive and negative difference frames.

5. The method of claim 2, wherein the decomposing comprises: creating a reference frame to remove the mover objects from the scene, such that in the reference frame, the mover objects are replaced by background image from frames adjacent to the two or more successive frozen images, the reference frame being utilized for reconstruction of the scene.

6. The method of claim 5, wherein the reference frame is a single reference frame transmitted for processing separate from the mover objects, and wherein the reference frame is compressed using lossless compression and the mover objects are compressed using a lossy technique.

7. The method of claim 2, wherein the filtering comprises:
    specifying an object box of pixels and a background box of pixels around each object of interest in the scene;
    convolving positive and negative difference frames in the created difference frames separately for the object box and the background box; and
    determining, based upon the convolving, whether or not the object of interest in the object box of pixels can be detected as a mover object.

8. The method of claim 1, wherein the scene is observed along a known direction of motion of an imaging platform for the receiving.

9. The method of claim 1, wherein the mover objects are compressed using track files that store position vectors associated with the mover objects.

10. The method of claim 1, wherein the leaner objects are annotated for respective heights.

11. The method of claim 1 further comprising:
    decompressing, using the image processor, data associated with the mover objects, the static objects, and the leaner objects; and
    reconstructing, using the image processor, the set of frozen images corresponding to the scene based upon the decompressing.

12. An image processing system, comprising:
    a mobile imaging platform having a sensor that is configured to capture images of a scene, each image comprising a plurality of pixels; and
    an image processor coupled to the mobile imaging platform and to one or more memory devices having instructions thereupon, which when executed by the image processor cause the image processor to:
        receive a set of frozen images, the set of frozen images being obtained by removing apparent motion between the images captured from the mobile imaging platform, the apparent motion arising due to motion of the mobile imaging platform and the images corresponding to a scene changing with time;
        decompose the set of frozen images to detect static objects, leaner objects, and mover objects in the scene, the mover objects being objects that change spatial orientation in the scene with time due to motion of the objects, and leaner objects being stationary features that appear to change spatial orientation in the scene with time due to motion of the mobile imaging platform; and
        compress the static objects, leaner objects, and mover objects in the scene separately using different compression techniques for storage and/or transmission.

13. The system of claim 12, wherein the image processor is configured to decompose the set of frozen images by:
    creating difference frames from two or more successive frozen images in the set of frozen images;
    applying thresholding to the difference frames;
    filtering the static objects, the leaner objects, and the mover objects from the thresholded difference frames based upon at least one of a shape and a size of the static objects, the leaner objects, and the mover objects; and
    creating a first video stream comprising only pixels identified as the mover objects and a second video stream comprising the mover objects and pixels not identified as the mover objects in the scene.

14. The system of claim 13, wherein the image processor is further configured to: compress the first video stream separately from the second video stream and at different respective rates of compression.

15. The system of claim 13, wherein the image processor is configured to create the difference frame by creating positive and negative difference frames and applying the thresholding and filtering to each of the positive and negative difference frames.

16. The system of claim 13, wherein the image processor is configured to decompose the set of frozen images by creating a reference frame to remove the mover objects from the scene, such that in the reference frame, the mover objects are replaced by background image from frames adjacent to the two or more successive frozen images, the reference frame being utilized for reconstruction of the scene.

17. The system of claim 16, wherein the reference frame is a single reference frame transmitted for processing separate from the mover objects, and wherein the reference frame is compressed using lossless compression and the mover objects are compressed using a lossy technique.

18. The system of claim 13, wherein the image processor is configured to filter by:
specifying an object box of pixels and a background box of pixels around each object of interest in the scene;
convolving positive and negative difference frames in the created difference frames separately for the object box and the background box; and
determining, based upon the convolving, whether or not the object of interest in the object box of pixels can be detected as a mover object.

19. The system of claim 12, wherein the scene is observed along a known direction of motion of the imaging platform for the image processor to receive the set of frozen images.

20. The system of claim 12, wherein the mover objects are compressed using track files that store position vectors associated with the mover objects, which position vectors are used by the image processor to reconstruct the scene.

21. The system of claim 12, wherein the leaner objects are annotated for respective heights.

22. The system of claim 12, wherein the image processor is further configured to: decompress data associated with the mover objects, the static objects, and the leaner objects; and reconstruct the-set of frozen images corresponding to the scene using the decompressed data.

23. A tangible non-transitory computer-readable storage medium having computer-readable instructions stored therein for processing images, which when executed by one or more processors cause the one or more processors to:
receive, a set of frozen images, the set of frozen images being obtained by removing apparent motion between images captured from a mobile imaging platform, the apparent motion arising due to motion of the mobile imaging platform and the images corresponding to a scene changing with time;
decompose the set of frozen images to detect static objects, leaner objects, and mover objects in the scene, the mover objects being objects that change spatial orientation in the scene with time due to motion of the objects, and leaner objects being stationary features that appear to change spatial orientation in the scene with time due to motion of the mobile imaging platform; and
compress the static objects, leaner objects, and mover objects in the scene separately using different compression techniques for storage and/or transmission.

\* \* \* \* \*